United States Patent [19]

Pace et al.

[11] 4,406,929
[45] Sep. 27, 1983

[54] HOOK STATUS DETECTOR FOR A SUBSCRIBER LOOP INTERFACE CIRCUIT

[75] Inventors: W. David Pace, Tempe; W. Eric Main, Mesa, both of Ariz.

[73] Assignee: Motorola Inc., Schaumburg, Ill.

[21] Appl. No.: 238,508

[22] Filed: Feb. 26, 1981

[51] Int. Cl.³ .............................................. H04B 1/58
[52] U.S. Cl. .......................... 179/170 NC; 179/18 FA
[58] Field of Search ...... 179/16 AA, 18 FA, 170 NC, 179/170 T, 170 R

[56] References Cited

U.S. PATENT DOCUMENTS

| 4,004,109 | 1/1977 | Boxall | 179/170 NC |
| 4,142,075 | 2/1979 | Olschewski | 179/170 NC |
| 4,203,012 | 5/1980 | Boxall | 179/170 NC |
| 4,300,023 | 11/1981 | Kelley et al. | 179/170 NC |

OTHER PUBLICATIONS

L. Brown & B. Bynum; "One Chip Closes in on Slic Functions"; Electronic Design; Sep. 1980; pp. 85, 90, 91.

Primary Examiner—G. Z. Rubinson
Assistant Examiner—Randall P. Myers

[57] ABSTRACT

A circuit for use with a subscriber loop interface circuit (SLIC) to detect the hook/switch status of the telephone handset driven by the SLIC. Responsive to metallic current flowing through the handset when the telephone is taken off hook, a voltage is derived which exceeds a threshold level as well as a current is produced which is proportional to the value of the metallic current. Whenever the produced current level is less than a predetermined value in conjunction with the threshold level being exceeded, a comparator threshold circuit is rendered operative to produce a signal indicative of the hook status being in a closed switch state. With the hook being in an open switch state, the voltage is caused to be less than the threshold level wherein the comparator threshold circuit is maintained in an nonoperative state.

21 Claims, 2 Drawing Figures

FIG. 1 — PRIOR ART —

HOOK STATUS DETECTOR FOR A SUBSCRIBER LOOP INTERFACE CIRCUIT

CROSS REFERENCE TO RELATED APPLICATION

The present invention is related to the subject matter disclosed in U.S. patent application, Ser. No. 066,213 now U.S. Pat. No. 4,300,023 entitled "Hybrid Circuit" filed by Kelley et al and assigned to the assignee of the present invention.

BACKGROUND OF THE INVENTION

1. Field of Invention

This invention relates to telephone subscriber loop interface circuits (SLICs) and more particularly to a monolithic integrated detection circuit for detecting the hook status of a telephone handset loop coupled to the SLIC.

2. Description of the Prior Art

Hybrid or subscriber loop interface circuits (SLICs) are generally known in the art which provide balanced two-wire to unbalanced four-wire conversion between subscriber telephone handsets and the central telephone office equipment. For example, U.S. Pat. No. 4,004,109 and the above referenced Kelley et al patent application describe such SLICs which are comprised of a plurality of complementary current mirror circuits.

Because the SLIC equipment is generally in use a small percentage of the time, it is desirous for the SLIC to include circuitry to detect the inactive ON-hook condition of the telephone handset to power down the SLIC internal circuits to minimize office power supply requirements.

Therefore, a need exists for circuit means to be included with contemporary SLICs for detecting the hook status of the subscriber loop which:

a. accurately measures the subscriber loop resistance b. prevents false off-hook conditions which may be caused by longitudinal signals appearing at the inputs of the SLIC c. requires no, or minimal, direct current power when the subscriber loop is open circuited and d. is independent to power supply voltage variations.

SUMMARY OF THE INVENTION

Accordingly, it is an object of the present invention to provide an improved circuit for sensing the resistance in a load loop coupled thereto.

Another object of the invention is to provide an improved circuit for detecting the subscriber loop load status coupled to a subscriber loop interface circuit (SLIC) for selectively rendering the interface circuit either operative or nonoperative.

In accordance with the above and other objects there is provided internally to an integrated interface system a circuit for detecting the status of a loop load coupled to the system and for rendering the system nonoperative when the loop is in an open circuit state and for rendering the system operative when a load resistance is placed within the loop, comprising, first current mirror circuitry coupled with the loop for providing a first predetermined current thereto, second current mirror circuitry coupled with the first circuit mirror circuitry for providing current to a reference circuit, and a threshold comparator coupled to both the first and second current mirror circuitry for rendering the system operative when the voltage developed across the reference circuit in response to the second current supplied thereto becomes greater than a predetermined threshold level and for maintaining the interface system non-operative when the voltage developed is less than the threshold voltage.

DETAILED DESCRIPTION OF THE PREFERRED EMBODIMENT

Figure 1:
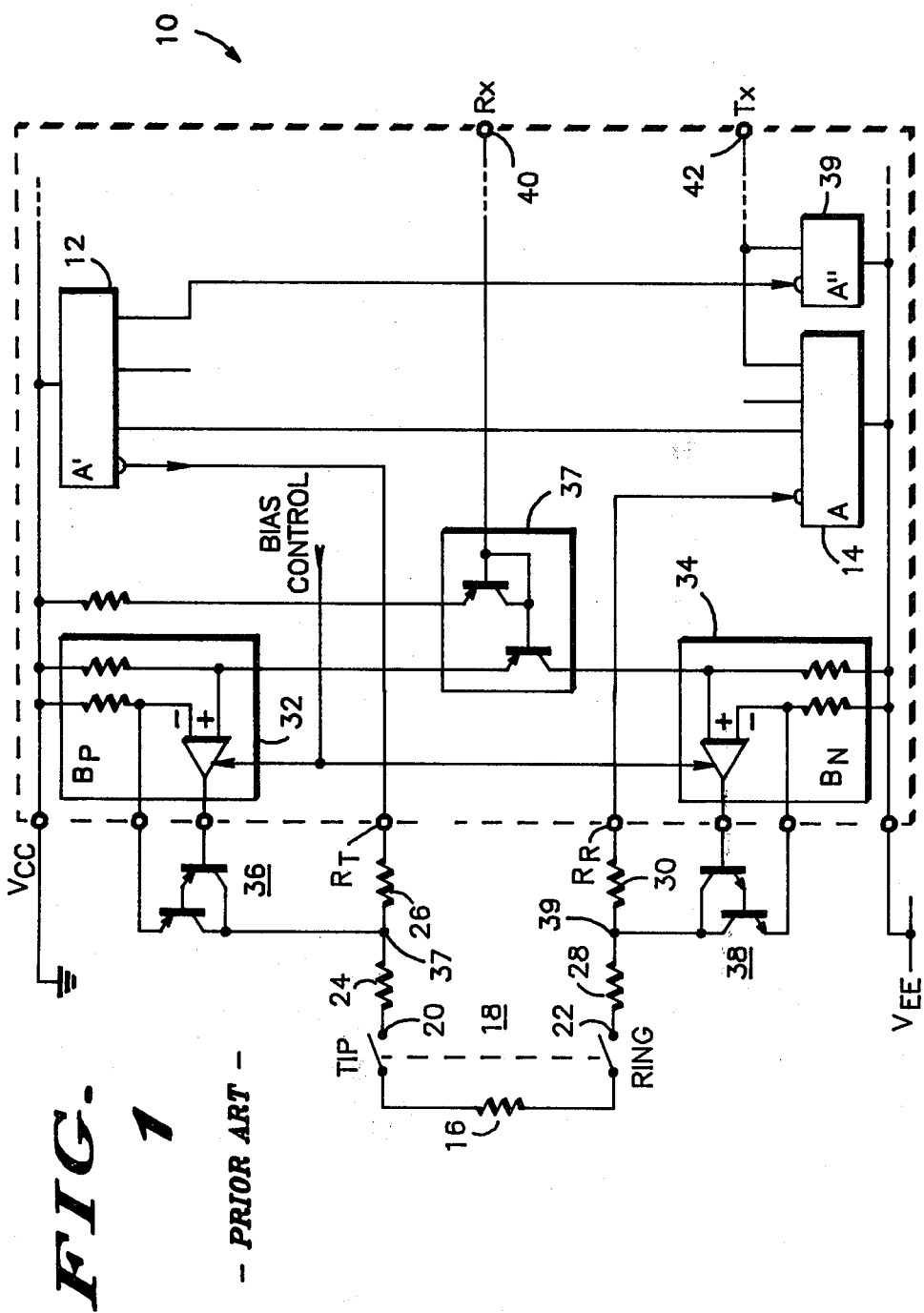
FIG. 1 is a partial block and schematic diagram of a contemporary integrated subscriber loop interface circuit including external associated circuitry coupled therebetween to a subscriber loop.

Turning to FIG. 1, there is shown subscriber loop interface circuit 10 that is fabricated in monolithic integrated circuit form with associated external circuitry for providing signal conversion beteen a balanced two-wire bidirectional subscribor loop and a pair of unbalanced unidirectional transmission paths Rx and Tx respectively. The operation of subscriber loop interface circuit 10 is fully disclosed in the aforereferenced Kelley patent application which is incorporated herein by reference. The subscriber loop interface circuit (SLIC) 10 may correspond to the MC3419 SLIC, manufactured by Motorola Inc., which is described in the Motorola Linear Interface Integrated Circuits Data Book, series C, copyrighted 1979, at pages 6-30 through 6-39. Hence, only a brief description of the main functions of SLIC 10 is described hereinafter.

SLIC 10 comprises a plurality of current mirror circuits 12 and 14 of a complementary conductivity type. Each current mirror circuit has an input terminal, designated by the small circle, and one or more output terminals as shown. A subscriber loop comprising a telephone handset as represented by resistor 16 is coupled through the telephone receiver hook as represented by switch 18 to the Tip and Ring loop terminals 20 and 22 such that with the telephone receiver on the hook the subscriber loop is disconnected from SLIC 10 as shown. When the telephone receiver is taken off hook, the subscriber loop, which also would have telephone lines resistance indicated by resistors 24 and 28 associated therewith, is coupled to terminals 20 and 22 by closing of switch 18. Tip terminal 20 is connected through resistors 24 and 26 to the RT terminal of SLIC 10 directly to the input of current mirror circuit 12. Likewise, Ring terminal 22 is connected through resistors 28 and 30 to the RR terminal of SLIC 10 to the input of current mirror circuit 14. Resistors 26 and 30 function as sense resistors to sense when the subscriber loop is coupled across the Tip and Ring terminals. Generally, resistors 26 and 30 are of large value being approximately 17K ohms in value.

If the subscriber loop is connected to the SLIC 10 as aforementioned, a metallic (load) current flows from current mirror circuit 12 through the loop comprising resistors 24, 26, 16, 28 and 30 to the input of current mirror circuit 14. In response to this current, current mirror circuits 12 and 14 are thereby rendered operative by the telephone (load resistance 16) being taken off-hook to produce a bias control signal that renders current amplifiers 32 and 34 conductive. Specific circuitry is shown within blocks identifying the $B_P$ and $B_N$ current amplifiers 32 and 34 as well as current ratioing circuit 37 that is not called out. This circuitry corresponds to circuitry shown in the above referenced Kelley patent. In response to current amplifiers 32 and 34 being rendered operative, Darlington amplifiers 36 and 38 supply loop current of sufficient magnitude via resistors 24 and 28 respectively through the telephone receiver 16 to operate the telephone handset. With the telephone handset operative, two-way communication is provided between the subscriber loop and the central office equipment via receive and transmit terminals 40 and 42 which are coupled through SLIC 10 to the Tip and Ring terminals 18 as is well understood. Thus, the receive signal appearing at terminal 40 passes through current ratioing circuitry, block 37 to operate the $B_p$ and $B_N$ current amplifier circuitry, which for general description purposes may also include Darlington amplifiers 36 and 38 respectively, to differentially drive the telephone handset. Similarly, in response to differential signals supplied from the telephone handset to terminals 20 and 22, two out of phase signals appear at the inputs of current mirrors 12 and 14. The input signal to current mirror 12 from the loop is inverted and summed in phase with an output of current mirror 14 via current mirror 39 to appear at output terminal 42 of SLIC 10.

One of the functions that SLIC 10 must perform is to enable and disable itself on the basis of the switch-hook condition of the attached telephone handset. With the telephone on hook, the Tip and Ring terminals, as previously described, are opened such that no metallic current can flow in resistors 26 and 30, thus, the input and various outputs of current mirror circuits A and A' (12 and 14) are zero.

Because SLIC 10 is generally in use a small percentage of the time, i.e., the switch hook is open circuited, it is desirous to power down the SLIC to minimize power supply requirements of the system. One method used in the past was to compare the load resistance 16 connected to the Tip and Ring terminals to a value of an internal reference resistor included in the integrated SLIC circuit since with an ON hook status the loop resistance is generally greater than 10K ohms whereas with OFF hook conditions the load resistance is typically less than 2.5K ohms. However, problems arise in this method of detecting OFF hook status of the switch hook since the load resistance of the subscriber loop does not vary with temperature and power supply variations in the same manner as the internal reference resistor comprising the integrated SLIC. Thus, some contemporary SLIC systems could not accurately measure the subscriber loop resistance and were susceptible to power supply voltage variations.

Figure 2:
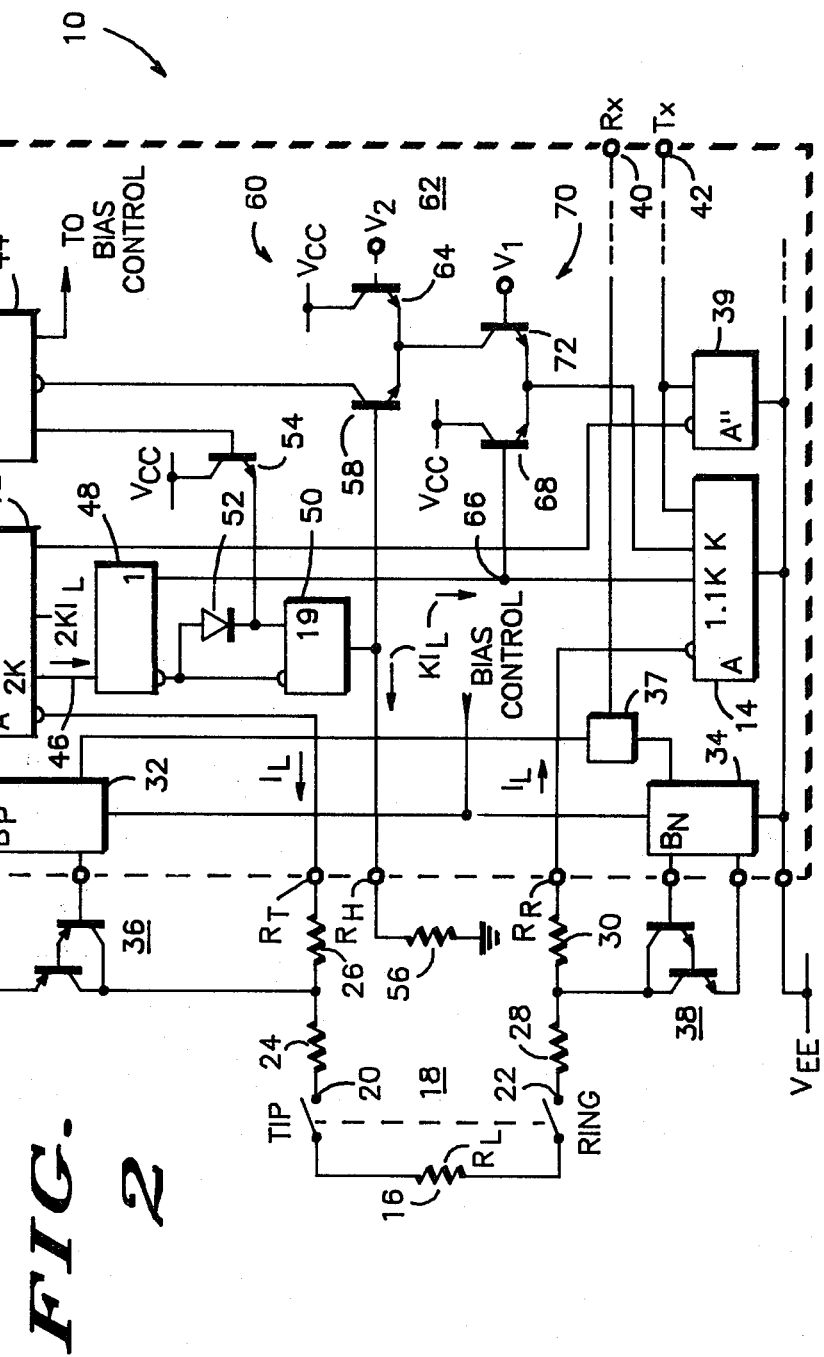
FIG. 2 is a partial schematic and block diagram of the detection circuit of the present invention.

Turning to FIG. 2, there is shown a circuit for detecting the aforementioned switch hook status which is suitable to be utilized in combination with the circuitry of SLIC 10 of FIG. 1 and which accurately measures the subscriber loop resistance while being immune to power supply voltage variations. It is to be understood that components of FIG. 2 corresponding to similar components in FIG. 1 are referenced by the same reference numerals. With the telephone receiver on hook (switch 18 open) very little, if any, loop current flows, as previously described, such that current mirror circuits 12 and 14, comprising a first current mirror circuitry of the same type structure as current mirrors 12 and 14 of FIG. 1, are rendered non-operative. In this state, as will be explained, current mirror circuit 44 (which is of similar structure as current mirror 12) is also made non-operative such that a bias control signal cannot be generated to render the B circuits (32, 36 and 34, 38) operative. Hence, the SLIC is powered down such that no direct current power is dissipated in SLIC 10 when the subscriber loop is open circuited.

When the telephone receiver is taken off hook, placing load resistance $R_L$ (the telephone handset resistance) as well as the telephone line impedance within the subscriber loop by closing of hook/switch 18, metallic (load) current IL is induced to flow from the input of current mirror circuit 12, as described previously, thereby; rendering this circuit operative. The current IL flows from terminal RT of SLIC 10 through resistors 26, 24 and, through resistors 28 and 30 to terminal RR into the input of current mirror circuit 14. Current mirror 12, being rendered operative, produces at one output thereof a current of value 2 $KI_L$ which is proportional to the load current; the gain factor K being a predetermined constant. This output current is supplied to a second current mirror circuitry comprising current mirrors 48 and 50 via lead 46 to the common terminal of current mirror 48. Current mirror 48, which may comprise a well known PNP current mirror circuit including a diode that is coupled across the base to emitter junction of a PNP transistor, essentially divides the current supplied thereto to produce two currents each of approximate value of $KI_L$ at the input and output thereof. The input of current mirror 48 is coupled both to the input of current mirror 50 and, via diode 52, to the output thereof such that, with transistor 54 being in a non-conducting state, a current $KI_L$ is produced at the common terminal of current mirror 50 which flows through terminal $R_H$ to external reference resistor 56. Thus, a voltage $V_{56}$ is developed across resistor 56 to one input, at the base of transistor 56 of a first comparator 60 of threshold circuit 62. As long as the voltage $V_{56}$ developed across resistor 56 is less than the reference threshold voltage $V_2$ that is supplied to the base of transistor 64 of threshold circuit 62 the threshold circuit is maintained in a first operating state with comparator 60 being in a condition wherein current mirror 44 and transistor 54 are non-operative; because transistor 58, which has its collector coupled to the input of current mirror 44, is biased in an off or in a non-conducting condition.

The output of current mirror 48 is coupled at node 66 both to a first output of current mirror 14 and to an input at the base of transistor 68 of a second comparator circuit 70 of threshold circuit 62. As long as the loop load current IL is flowing to the input of current mirror 14, the output thereof coupled to node 66 will sink current therefrom up to the magnitude of 1.1 $KI_L$. Thus, all of the current sourced to node 66 from current mirror 48 drives the output of current mirror 14 and the voltage appearing at the base of transistor 68 is therefore made to be less than the reference threshold voltage $V_1$ supplied to the second input of comparator 70 at the base of transistor 72. Transistor 72, which has its emitter coupled in common with the emitter of transistor 68 to an output of current mirror 14 and its collector coupled to the commonly connected emitters of transistors 58 and 64, biases comparator 60 in its ready state such that current can be sourced thereto whenever $V_{56}$ exceeds $V_2$.

The threshold reference voltage $V_2$ is made approximately equal to the voltage differential between the $R_T$ and $R_R$ terminals. When hook/switch 18 is closed, the current $KI_L$ produces a voltage across resistor 56 which exceeds the threshold voltage $V_2$, rendering transistor 58 conductive if, as mentioned above, the current sourced at node 66 by current mirror 14 is greater than the current supplied to node 66 from current mirror 48. As the threshold voltage is exceeded, comparators 70 and 60 will pass current to the input of current mirror 44. This condition accurately determines that, at threshold, $$R_L \text{ (threshold)} = KR56 - (R24 + R26 + R28 + R30) \quad (1)$$

where:
K is the gain factor of the current mirrors.
R56 is resistor 56.
R24, R26, R28, R30 correspond to the value of the referenced resistors.

Hence, the external resistor 56 allows accurate programming of the ON-to-OFF hook threshold loop load resistance independent to supply voltage variations.

It is understood that the same condition described above for rendering transistor 72 of comparator 70 conducting to pass current to comparator 60 can be achieved by making the gain of current mirror 14 greater than the gain of current mirror 12. This will cause the current sourced to node 66 from current mirror 48 to be less that the current sinking requirements of the output of current mirror 14 coupled to this node when input currents to current mirrors 12 and 14 are equal.

Following threshold (off-hook) detection, current mirror 44 of threshold circuit 62 is rendered operative such that both transistor 54 is rendered conductive and bias control signals are produced to render the B circuit devices, (32, 34, 36, 38) operative whereby additional loop current is supplied to operate the telephone handset represented by RL as described above. This additional current causes the currents in resistors 26 and 30 to decrease which corresponds to a reduction of the direct current SLIC source impedance; the (R24+R26+R28+R30) term of equation (1). To prevent the reduction of current IL to the input of current mirrors 12 and 14 from affecting the operation of SLIC 10 that may otherwise produce oscillations caused by a false sense of an ON-hook state, hysteresis is provided by transistor 54 as will be described hereinafter.

When transistor 54 is rendered conductive, as previously described, diode 52 is rendered nonconductive wherein all of the current from the output of current mirror 50 is passed to transistor 54. As indicated, the output of current mirror 50 has a gain factor of 19 such that the current supplied to the current mirror input is required only to be 1/19th of the output current (it is to be understood that a gain factor of 19 is illustrative only). Hence, with transistor 54 conducting, only 1/20th of the normal current supplied from current mirror 12, via current mirror 48, is required to maintain transistor 58 conductive by maintaining the voltage across resistor 56 greater than the threshold reference voltage $V_2$. This effectively increases the value of resistor 56 by 20 times its actual value. In this example, a 20:1 ratio is established between the OFF-hook and ON-hook threshold currents at the inputs of current mirrors 12 and 14 to prevent oscillations during hook/switch transitions.

A feature of the invention is that the detection circuit detects that nearly equal currents IL are flowing into the inputs of current mirrors 12 and 14 such that longitudinal signals cannot produce false OFF-hook conditions. Longitudinal signals are defined as those signals which produce a common mode voltage at Tip and Ring terminals 20 and 22. If, for example, the telephone handset was on hook, switch 18 open, the currents $I_L$ would not be produced or would be minimal being leakage currents. However, if a large longitudinal signal is induced across terminals 20 and 22, both terminals would have either a common positive or common negative voltage supplied thereat. Hence, if for instance, a common mode negative voltage is applied across the two terminals, currents could be produced only to the input of current mirror 12. The input current to current mirror 14 in this situation would be much less than the current caused at the input of current mirror 12. Hence, node 66 would be at a high voltage rendering transistor 72 and comparator 60 non-conductive. Reiterating, in order to make threshold circuit 62 operative to sense on OFF-hook state, two conditions must be met i.e., 1. The output current of current mirror 14 must be greater than the current, $KI_L$, supplied to node 66; and
2. The voltage V56 across resistor 56 must be greater than $V_2$.

Similarly, the positive common mode voltage would produce a current through resistor 56 of insufficient value to cause the voltage thereacross to exceed the threshold voltage V2 because the current IL produced at the input of current mirror 12 is less than that required to cause the current to resistor 56 to exceed threshold level.

Thus, what has been described above, is a novel detecting circuit for accurately measuring a load loop resistance supplied thereto and which draws no direct current power when the load loop is open circuited. Additionally, the threshold level at which the circuit detects a load loop condition is immune to power supply voltage variations. It is to be understood that although the novel detecting circuit has been described in reference to an integrated SLIC circuit for detecting the subscriber loop load status, the above described detecting circuit comprising known PNP and NPN current mirrors may be utilized in other circuit applications for detecting a change in a load resistance coupled to a circuit including the novel circuit.

We claim:

1. A circuit to which is coupled a load impedance for detecting a change in the magnitude of the load impedance from an essentially infinite impedance value to a finite value, comprising:

first current mirror means coupled with the load impedance which is rendered operative when the load impedance is a finite value for providing current therethrough;

second current mirror means coupled with said first current mirror means which is responsive to said first current means being rendered operative for providing first and second output currents at first and second outputs, said first and second output currents being proportional to said current flowing through the load impedance; and threshold circuit means coupled with said first and second outputs of said second circuit mirror means and to said first current mirror means which is responsive to said first and second current mirror means being rendered operative by changing from a first operating state to a second operating state, which change being indicative of the change in the magnitude of the load impedance.

2. The circuit of claim 1 wherein said first current mirror means includes:
a first current source circuit having an input and at least one output, said input being coupled at a first output of the circuit to the load impedance, said at least one output being coupled to said second current mirror means, said first current source supplying a current to the load impedance of a first value and providing a current proportional to said load current at said output thereof; and
a second current source circuit having an input and at least two outputs, said input being coupled at a second output of the circuit to the load impedance thereby coupling the load impedance in series between said first and second current source circuits, the first one of said outputs being coupled to said second output of said second current mirror means, said second output being coupled to said threshold circuit means.

3. The circuit of claim 2 wherein said second current mirror means includes:
a third current source circuit having an input, an output and a common terminal, said common terminal being coupled to said at least one output of said first current source circuit, said output being coupled to said second output of said second current mirror means; and
a fourth current source circuit having an input, an output and a common terminal, said input and output being coupled respectively to said input of said third current source circuit, said common terminal being said first output of said second current mirror means.

4. The circuit of claim 3 wherein said threshold circuit means includes:
first comparator means having first and second inputs and an output, said first input receiving a first threshold potential, said second input being coupled to said common terminal of said fourth current source circuit;
first circuit means coupled to said common terminal of said fourth current source circuit for producing a voltage thereacross in response to said first output current from said second current mirror means; and
current source means coupled between said first and second outputs of said second current source circuit to said first comparator means for passing current thereto.

5. The circuit of claim 4 wherein said current source means is a second comparator means having first and second inputs, an output and a common terminal, said first input receiving a second threshold potential, said second input being coupled to said output of said third current source circuit, said common terminal being coupled to said second output of said second current source circuit, said output being coupled to said first comparator means, said second comparator means being responsive to said second current source circuit requiring a current to be sourced to said first output thereof which has a value greater than said second current provided by said second current mirror means at said second output thereof to pass current to said first comparator means.

6. The circuit of claim 5 wherein:
said first comparator means being a differential amplifier including a pair of transistors having commonly connected emitter electrodes, base electrodes and collector electrodes, said base electrode of said first one of said transistors being said first input, said base electrode of said second one of said transistors being said second input, said collector electrode of said first transistor being coupled to a first terminal at which is supplied a source of operating potential, said collector electrode of said second transistor being coupled to an output of said first comparator means; and
said second comparator means being a differential amplifier including a pair of transistors having commonly connected emitter electrodes, base electrodes and collector electrodes, said base electrode of a first one of said transistors being said first input, said base electrode of the second one of said transistors being said second input, said commonly connected emitter electrodes being coupled to said common terminal, said collector of said first transistor being coupled to said commonly connected emitter electrodes of said pair of transistors of said first comparator means, said collector of said second transistor being coupled to said first terminal.

7. The circuit of claim 6 wherein said threshold circuit means further includes:
a fifth current source circuit having an input and at least one output, said input being coupled to said output of said first comparator means; and
a transistor having first, second and control electrodes, said control electrode being coupled to said at least one output of said fifth current source circuit, said first electrode being coupled to said output of said fourth current source circuit and said second electrode being coupled to said first terminal.

8. The circuit of claim 7 wherein said second current mirror means includes diode means coupled between said input of said third current source circuit and said output of said fourth current source circuit.

9. Circuit suitable for manufacture in integrated circuit form that is adapted to be coupled to an external load impedance for producing a signal in response to the magnitude of the load impedance changing from a high impedance value to a low impedance value, relative to one another, comprising:
first circuit means having first and second inputs and a plurality of outputs, said first and second inputs being coupled to the load impedance for supplying a load current therethrough which varies in response to the magnitude of the load impedance changing and for providing currents at said plurality of outputs which are proportional to said load current;
second circuit means coupled at respective ones of said plurality of outputs of said first circuit means and being rendered operative thereby for supplying first and second currents at first and second outputs, said first output being coupled to an external terminal of the circuit;
external circuit means connected to said external terminal for developing a voltage thereat in proportion to said first current; and
threshold circuit means coupled with said first and second outputs of said second circuit means and to respective ones of said plurality of outputs of said first circuit means which is responsive to said voltage developed across said external circuit means exceeding a predetermined value in conjunction with said second current supplied at said second output of said second circuit means being less than is required to be sourced to a respective one of said plurality of outputs of said first circuit means to which said second output of said second circuit means is connected for producing the signal at an output thereof, said signal being indicative of the change in the magnitude of the load impedance.

10. The circuit of claim 9 wherein said threshold circuit means includes:
first comparator means having first and second inputs, an output and common terminal, said first input being coupled to said first output of said second circuit means, said second input receiving a first threshold potential,
second comparator means having first and second inputs, an output and common terminal, said first input being coupled both to said second output of said second circuit means and a first output of said first circuit means, said second input receiving a second threshold potential, said output being coupled to said common terminal of said first comparator means, said common terminal being coupled to a second output of said first circuit means, said second comparator means being rendered operative when the current sourced at said first output of said first circuit means is greater than the value of said second current that is produced by said second current means at said second output thereof; and
said first comparator means being rendered responsive by said second comparator means in conjunction with said voltage developed in proportion to said first current exceeding said first threshold potential for producing the signal indicative of a change in the load impedance.

11. The circuit of claim 10 wherein said first circuit means includes:
a first current mirror circuit having an input and at least one output, said input being coupled to said first input of said first circuit means, said at least one output being coupled to said second circuit means, said first current mirror circuit providing first and second proportionally related currents at said input and said at least one output; and
a second current mirror circuit having an input and at least two outputs, said input being coupled to said second input of said first circuit means, said at least two outputs being coupled respectively to said first and said second outputs of said first circuit means.

12. The circuit of claim 11 wherein said second circuit means includes:
a third current mirror circuit having a common terminal, an input and an output, said common terminal being coupled to said at least one output of said first current mirror circuit, said third current mirror circuit being responsive to said first current mirror circuit for providing substantially equal currents at said input and output, said output being said second output of said second circuit means; and
a fourth current mirror circuit having an input, an output and a common terminal, said input and output being coupled to said input of said third current mirror circuit, said common terminal being said first output of said second circuit means.

13. The circuit of claim 12 wherein said first an second comparator means are transistor differential amplifiers.

14. The circuit of claim 12 including diode means coupled between said input of said third current mirror circuit and said output of said fourth current mirror circuit.

15. The circuit of claim 14 wherein said threshold circuit means includes:
a fifth current mirror circuit of said first conductivity type having an input and at least one output, said input being coupled to said output of said first comparator means; and
a transistor having first, second and control electrodes, said control electrode being coupled to said at least one output of said fifth current mirror circuit, said first electrode being coupled to said output of said fourth current mirror circuit, and said second electrode being coupled to a terminal at which is supplied a source of operating potential.

16. In an integrated subscriber loop interface circuit for providing two-wire balanced to four-wire single ended signal conversion between telephone central office equipment and a loop incorporating a telephone handset including a first and a second current mirror circuit of opposite conductivity type to provide direct current to the loop whenever the handset is taken off hook, each of the first and second current mirror circuits having a plurality of outputs, a circuit for detecting the telephone handset on-hook to off-hook status, comprising:
first circuit means having an input and first and second outputs for producing first and second currents thereat proportional to the loop current when the telephone is off-hook, said input being connected to a first output of the first current mirror circuit, said first output being coupled to an external terminal of the subscriber loop interface circuit at which is supplied said first current and said second output being connected to a first output of the second current mirror circuit;
second circuit means external to the subscriber loop interface circuit which is coupled to said external terminal for establishing a voltage thereat in accordance to said first current;
threshold circuit means coupled to said first and second outputs of said first circuit means and to said first output and a second output of the second current mirror circuit which is responsive to said voltage established by said second circuit means becoming greater than a predetermined first threshold potential in conjunction with all of said second current sourced from said second output of said first circuit means being sunk at said first output of the second current mirror circuit for changing from a first conducting state to a second conductive state to provide a signal at an output indicative to the telephone being in an off-hook condition.

17. The circuit of claim 16 wherein said first circuit means includes:
a third current mirror circuit having a common terminal, an input and an output, said common terminal being said input of said first circuit means which is coupled to said first output of the first current mirror circuit such that essentially equal valued currents having a magnitude proportional to the loop current are produced at said input and output, said output being coupled to said first output of the second current mirror circuit; and
a fourth current mirror circuit having a common terminal, an input and an output, said input being directly connected to said output of said third current mirror circuit, and said output being coupled to said input of said third current mirror circuit, said common terminal being said first output of said first circuit means, said fourth current mirror circuit having a predetermined gain characteristic between said input and said output.

18. The circuit of claim 17 wherein said threshold circuit means includes:

a first comparator having first and second inputs, an output and a common terminal, said first input being coupled both to said output of said third current mirror circuit and said first output of the second current mirror circuit, said second input receiving a first threshold potential thereat, said common terminal being coupled to said second output of the second current mirror circuit such that said first comparator is rendered operative to pass current at said output whenever the current at said first output of said second current mirror circuit exceeds the value of said current supplied at said output of said third current mirror circuit; and a second comparator having first and second inputs, an output and a common terminal, said first input being coupled to said external terminal, said second input receiving a second threshold potential thereat, said common terminal being coupled to said output of said first comparator, said second comparator being rendered operative such that said signal indicative of the telephone handset being off-hook is produced at said output thereof when said voltage at said first input becomes greater than said second threshold potential and said first comparator is operative.

19. The circuit of claim 18 wherein said second circuit means is a resistor having a predetermined value which is coupled between said external terminal and an additional terminal to a second source of potential.

20. The circuit of claim 19 including third circuit means coupled between said output of said second comparator and said output of said third current mirror circuit to said output of said fourth current mirror circuit for effectively increasing the value of said resistor by the amount proportional to said gain transfer characteristic of said fourth current mirror circuit as said second comparator is rendered operative.

21. The circuit of claim 20 wherein said third circuit means includes:

diode means coupled between the said input of said third current mirror circuit and said output of said fourth current mirror circuit;

a fifth current mirror circuit having an input coupled to said output of said second comparator, and at least one output; and a transistor having first, second and control electrodes, said control electrode being coupled to said at least one output of said fifth current mirror circuit, said first electrode being coupled to said output of said fourth current mirror circuit and said second electrode being coupled to a first terminal at which is supplied a source of operating potential.

* * * * *